US010045240B2

(12) United States Patent
Oh et al.

(10) Patent No.: US 10,045,240 B2
(45) Date of Patent: Aug. 7, 2018

(54) FRAME TRANSMISSION SYSTEM AND METHOD OF INTERFERENCE ALIGNMENT AND CONTROLLING IN MULTI-CELL RANDOM ACCESS NETWORK

(71) Applicant: Electronics and Telecommunications Research Institute, Daejeon (KR)

(72) Inventors: Jin Hyung Oh, Daejeon (KR); Bang Chul Jung, Tongyeong-si (KR); Hu Jin, Yongin-Si (KR); Myung Sun Song, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 15/805,787

(22) Filed: Nov. 7, 2017

(65) Prior Publication Data
US 2018/0063734 A1 Mar. 1, 2018

Related U.S. Application Data

(62) Division of application No. 14/744,821, filed on Jun. 19, 2015, now Pat. No. 9,843,949.

(30) Foreign Application Priority Data

Jun. 20, 2014 (KR) .................. 10-2014-0075601
Feb. 23, 2015 (KR) .................. 10-2015-0025000

(51) Int. Cl.
*H04W 72/08* (2009.01)
*H04W 24/08* (2009.01)
(Continued)

(52) U.S. Cl.
CPC .......... *H04W 24/08* (2013.01); *H04W 24/02* (2013.01); *H04B 7/0695* (2013.01); *H04W 74/006* (2013.01); *H04W 74/0833* (2013.01)

(58) Field of Classification Search
None
See application file for complete search history.

(56) References Cited

U.S. PATENT DOCUMENTS 7,085,284 B1 8/2006 Negus
8,811,552 B2 * 8/2014 Bayesteh ............ H04B 7/0452
375/346

(Continued)

FOREIGN PATENT DOCUMENTS

KR 1020080075803 A 8/2008
KR 1020100110965 A 10/2010
KR 101290918 B1 7/2013

OTHER PUBLICATIONS

Hyun Jong Yang et al., Opportunistic Interference Alignment for MIMO Interfering Multiple-Access Channels, IEEE Transactions on Wireless Communications, May 2013, 2180-2192, vol. 12, Issue No. 5.

*Primary Examiner* — Brian Roberts
(74) *Attorney, Agent, or Firm* — William Park & Associates Ltd.

(57) ABSTRACT

Provided is a frame transmission method of interference alignment (IA) and controlling, the method including calculating a channel matrix of a basic service set (BSS) by measuring channel information between an access point and a user terminal, performing singular value decomposition (SVD) based on the calculated channel matrix, selecting a beamforming vector in consideration of an interference amount associated with another access point based on the SVD performed by the channel matrix, and calculating a leakage interference (LIF) value based on the selected beamforming vector.

3 Claims, 8 Drawing Sheets

(51) Int. Cl.
*H04W 24/02* (2009.01)
*H04W 74/08* (2009.01)
*H04W 74/00* (2009.01)
*H04B 7/06* (2006.01)

(56) References Cited

U.S. PATENT DOCUMENTS

| | | |
|---|---|---|
| 2002/0110085 A1 | 8/2002 | Ho et al. |
| 2006/0050742 A1 | 3/2006 | Grandhi et al. |
| 2010/0103913 A1 | 4/2010 | Sung et al. |
| 2010/0265813 A1* | 10/2010 | Pereira .............. H04W 28/0231 370/201 |
| 2011/0059765 A1* | 3/2011 | Kim ................. H04B 7/024 455/550.1 |
| 2013/0258971 A1* | 10/2013 | Lee ................. H04W 72/082 370/329 |
| 2013/0267266 A1* | 10/2013 | Park ................. H04B 7/0456 455/501 |
| 2013/0279422 A1* | 10/2013 | Kim ................. H04W 24/02 370/328 |
| 2013/0336233 A1 | 12/2013 | Kim et al. |
| 2014/0056204 A1 | 2/2014 | Suh et al. |
| 2014/0177546 A1 | 6/2014 | Kang et al. |
| 2014/0192730 A1 | 7/2014 | Seo et al. |
| 2014/0204773 A1 | 7/2014 | Jose et al. |

\* cited by examiner

FRAME TRANSMISSION SYSTEM AND METHOD OF INTERFERENCE ALIGNMENT AND CONTROLLING IN MULTI-CELL RANDOM ACCESS NETWORK

CROSS-REFERENCE TO RELATED APPLICATION

This application claims the priority benefit of Korean Patent Application No. 10-2014-0075601, filed on Jun. 20, 2014, and Korean Patent Application No. 10-2015-0025000, filed on Feb. 23, 2015, in the Korean Intellectual Property Office, the disclosure of which is incorporated herein by reference.

BACKGROUND

1. Field of the Invention

The present invention relates to a method of controlling interference between multi-cells in a random access network, and more particularly, to a technical idea of accessing a beamforming and a channel based on channel information obtained in a distributed manner in the random access network.

2. Description of the Related Art

Since users increasingly converge on a small space and mobile data traffic is gradually increasing, extensive interference among the users in a wireless communication network may be generated. Accordingly, an effective communication by the users may place a high priority on controlling an interference that degrades a network performance A channel in which the interference among the users is present may be referred to as an interference channel. The simplest method of removing the interference from the interference channel is the users utilizing limited communication resources without sharing, for example, a time, a frequency, and an antenna. A time division multiple access (TDMA) to divide and use a time, or a frequency division multiple access (FDMA) to divide and use a frequency may be included in the foregoing method. However, since the method supports communication for a single user at a time, spectral efficiency is substantially low. Thus, multiple users may need to simultaneously use the communication resources in order to enhance system performance. Conducting research on interference channels and finding an optimal interference control scheme may be significant to enhance efficiency in communication.

Recently, based on an information theory, a new scheme, for example, an interference alignment (IA), may obtain a multiplexing gain enhanced when compared to conventional technology. In a case of a current IA scheme, issues, such as a calculation complexity required for each terminal and information on a wireless channel to be provided in advance may occur in practice.

Accordingly, to implement the IA scheme in an actual system, signaling overhead among geometrically increasing nodes may be required. The requirement of signaling overhead may be a greatest factor hindering actual implementation. Therefore, technology for solving an issue of the requirement of signaling overhead and maximizing a performance gain of the IA in a random access network may be required.

Recently, in a cellular system, an opportunistic interference alignment (OIA) scheme to reduce the signaling overhead is proposed. Through the OIA scheme, beamforming may be implemented to allow users to minimize interference in another cell based on restricted channel information and thus, a base station may be allowed to select a user corresponding to a least amount of interference in another cell, in a cell of the base station. The selection may be available in the cellular system. However, a direct application of the OIA may have an issue since a centralized controller, such as a base station, is not a basic element of the random access system.

SUMMARY

According to an aspect of the present invention, there is provided a frame transmission method of interference alignment (IA) and controlling, the method including verifying channel information associated with an adjacent channel, receiving a receiving vector from an access point of the adjacent channel, calculating an effective channel matrix using the verified channel information and the received receiving vector, measuring an interference amount based on the calculated effective channel matrix, and selecting a user terminal to which transmission is to be directed based on the measured interference amount.

The calculating may include calculating the effective channel matrix by measuring the channel information including a sounding frame or a beacon frame periodically transmitted to the user terminal from the access point.

The calculating may include transmitting desired signal space information including a null space and interference space information randomly generated for IA to the user terminal through the sounding frame or the beacon frame, wherein the interference space information is information associated with an interference space allowing interference from user terminals in different cells, and the desired signal space information is information associated with a space set by the access point to receive a signal.

According to another aspect of the present invention, there is provided a frame transmission method of IA and controlling, the method including calculating a channel matrix of a basic service set (BSS) by measuring channel information between an access point and a user terminal, performing singular value decomposition (SVD) based on the calculated channel matrix, selecting a beamforming vector in consideration of an interference amount associated with another access point based on the SVD performed by the channel matrix, and calculating a leakage interference (LIF) value based on the selected beamforming vector.

The selecting of the beamforming vector may include selecting a beamforming vector of which the interference amount associated with another access point is a minimum.

According to still another aspect of the present invention, there is provided a frame transmission method of IA and controlling, the method including receiving a contention window (CW) value broadcasted by an access point, setting a backoff counter based on the received CW value, and generating a LIF value related to an access point monitored for a predetermined period of time and performing a backoff by setting the backoff counter when a channel is in an idle state.

The performing of the backoff may include dividing a range of cumulative distribution function (CDF) values based on the CW value, calculating the LIF value based on a channel condition during a transmission attempt, calculating the CDF values corresponding to the calculated LIF value, and selecting the backoff counter based on the calculated CDF values.

The backoff counter may be selected according to a channel characteristic based on the LIF value and determined to be a value between 1 and the CW value.

The frame transmission method of IA and controlling may further include decreasing the selected backoff counter by 1 for each backoff slot and attempting a packet transmission through a user terminal of which the backoff counter is to be 0.

The frame transmission method of IA and controlling may further include decreasing the backoff counter for each backoff slot and suspending the backoff when a user terminal attempts a packet transmission.

The CW value may be set at the access point based on a first throughput obtained from a packet that arrives in a desired signal space and a second throughput to be obtained through a multiple-packet recovery using a user terminal performing simultaneous transmissions throughout a system.

The CW value may be set as a constant based on a reciprocal value to maximize a sum of the first throughput and the second throughput.

According to a further aspect of the present invention, there is provided a frame transmission method of IA and controlling, the method including verifying a number of users attempting simultaneous transmissions in different cells, comparing the verified number of users to a number of antennas at an access point, and setting, based on a result of the comparing, to receive a stream in a multiple-packet scheme when the number of antennas at the access point is less than the verified number of users.

The frame transmission method of IA and controlling may further include determining whether multiple users attempt the simultaneous transmissions, and the verifying may include verifying the number of performing the simultaneous transmissions in the different cells when the multiple users attempt the simultaneous transmissions.

According to still another aspect of the present invention, there is provided a frame transmission system of IA and controlling, the system including a calculator configured to calculate a channel matrix of a BSS by measuring channel information between an access point and a user terminal, a processor configured to perform SVD based on the calculated channel matrix, and a selector configured to select a beamforming vector in consideration of an interference amount associated with another access point based on the SVD performed by the channel matrix, wherein the calculator may calculate an LIF value based on the selected beamforming vector.

The calculator may calculate the channel matrix by measuring the channel information including a sounding frame or a beacon frame periodically transmitted to the user terminal from the access point.

The calculator may transmit desired signal space information including a null space and interference space information randomly generated for IA to the user terminal through the sounding frame or the beacon frame, wherein the interference space information may be information associated with an interference space allowing interference from user terminals in different cells, and the desired signal space information may be information associated with a space set by the access point to receive a signal.

According to yet another aspect of the present invention, there is provided a frame transmission system of IA and controlling, the system including a receiver configured to receive a CW value broadcasted by an access point, a setter configured to set a backoff counter based on the received CW value, and a processor configured to generate an LIF value related to an access point monitored for a predetermined period of time and perform a backoff by setting the backoff counter when a channel is in an idle state.

The processor may divide a range of CDF values based on the CW value, calculate the LIF value based on a channel condition during a transmission attempt, calculate the CDF values corresponding to the calculated LIF value, and select the backoff counter based on the calculated CDF values.

According to further another aspect of the present invention, there is provided a frame transmission system of IA and controlling, the system including a counter configured to verify a number of users performing simultaneous transmissions in different cells, a comparer configured to compare the verified number of users to a number of antennas at the access point, and a setter configured to set, based on the result of the comparing, to receive a stream in a multiple-packet scheme when the number of antennas at the access point is less than the verified number of users.

The frame transmission system of IA and controlling may further include a determiner configured to determine whether multiple users attempt the simultaneous transmissions, wherein the counter may verify the number of users performing simultaneous transmissions in different cells when the multiple users attempt the simultaneous transmissions.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which.

DETAILED DESCRIPTION

Figure 1:
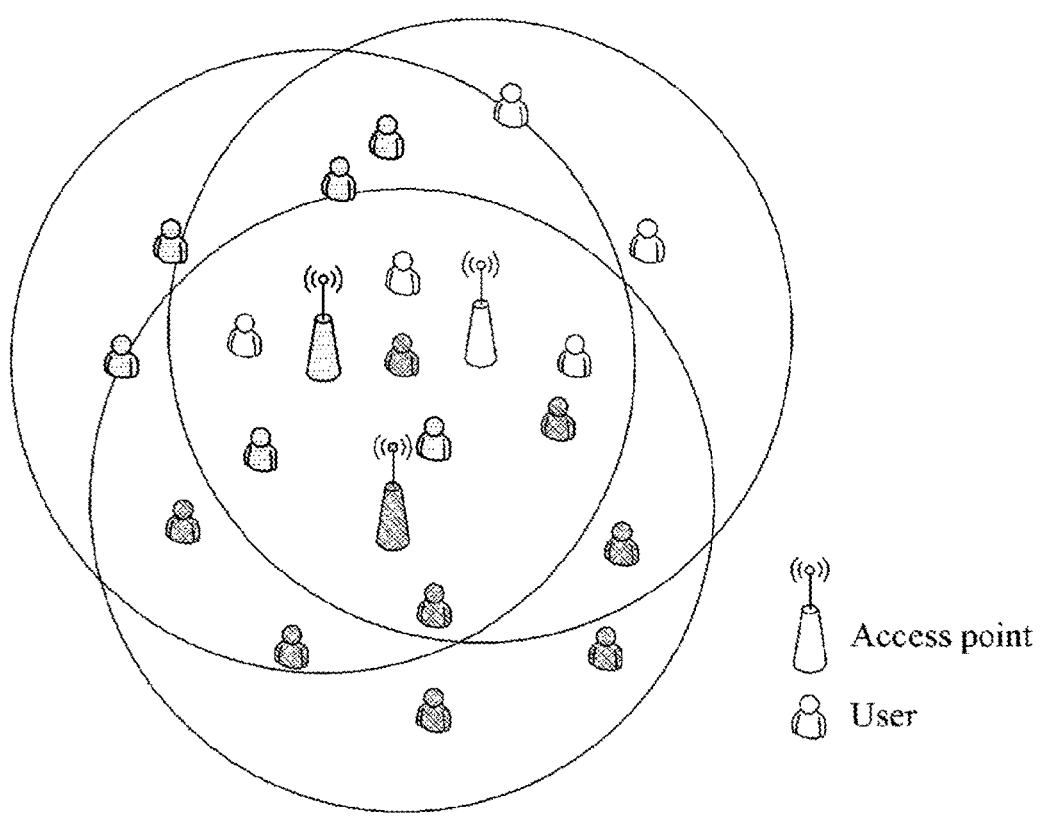
FIG. 1 is a diagram illustrating a multi-cell random access network according to an embodiment of the present invention.

Hereinafter, example embodiments of the present invention will be described with reference to the drawings.

When it is determined a detailed description related to a related known function or configuration they may make the purpose of the present invention unnecessarily ambiguous in describing the present invention, the detailed description will be omitted here. Also, terminologies used herein are defined to appropriately describe the exemplary embodiments of the present invention and thus may be changed depending on a user, the intent of an operator, or a custom. Accordingly, the terminologies must be defined based on the following overall description of this specification. Like reference numerals refer to like elements throughout.

FIG. 1 is a diagram illustrating a multi-cell random access network 100 according to an embodiment of the present invention.

The multi-cell random access network 100 includes multiple users and multiple access points distributed in an area.

Each of the access points may communicate with the multiple users. FIG. 1 is a diagram illustrating a system scenario implemented by the multiple access points and the multiple users, and the users may communicate with the corresponding access points. The corresponding access points and the users may include a single cell and a basic service set (BSS). A network topology in which individual BSSs overlap may be referred to as an overlapping cell or an overlapping basic service set (OBBS). The access points and user terminals may be equipped with multiple antennas and the user terminals may process a channel access for a communication with the access points based on a random access scheme.

To implement an interference alignment (IA) scheme in an actual system, signaling overhead among geometrically increasing nodes may be needed. The need for the signaling overhead may be a greatest factor hindering an actual implementation. The present disclosure may effectively solve an issue of needing the signaling overhead and maximize a performance gain of the IA in a random access network.

The present disclosure may perform the IA and controlling to implement beamforming of a user to minimize interference amount to a cell or an access point, and perform backoff of users for a multiple user channel access.

The present disclosure may also provide an optimal contention window (CW) value based on a backoff algorithm for the IA and controlling, and allow the multiple users to receive a multi stream from an access point when a simultaneous transmission is performed.

A frame transmission method of IA and controlling may verify channel information associated with an adjacent channel and receive a receiving vector from an access point of the adjacent channel.

An effective channel matrix may be calculated using the verified channel information and the received receiving vector and an interference amount may be measured based on the calculated effective channel matrix.

In an example, to calculate the effective channel matrix, channel information including a sounding frame or a beacon frame periodically transmitted to a user terminal from an access point may be measured. Also, desired signal space information including a null space and interference space information randomly generated for an IA may be transmitted to the user terminal through the sounding frame and the beacon frame. The interference space information corresponds to information associated with an interference space allowing interference from user terminals in different cells and the desired signal space information corresponds to information associated with a space set by the access point to receive a signal.

Hereinafter, the frame transmission method of IA and controlling may perform the IA and controlling by selecting a user terminal to which transmission is to be directed based on the measured interference amount.

Figure 2:
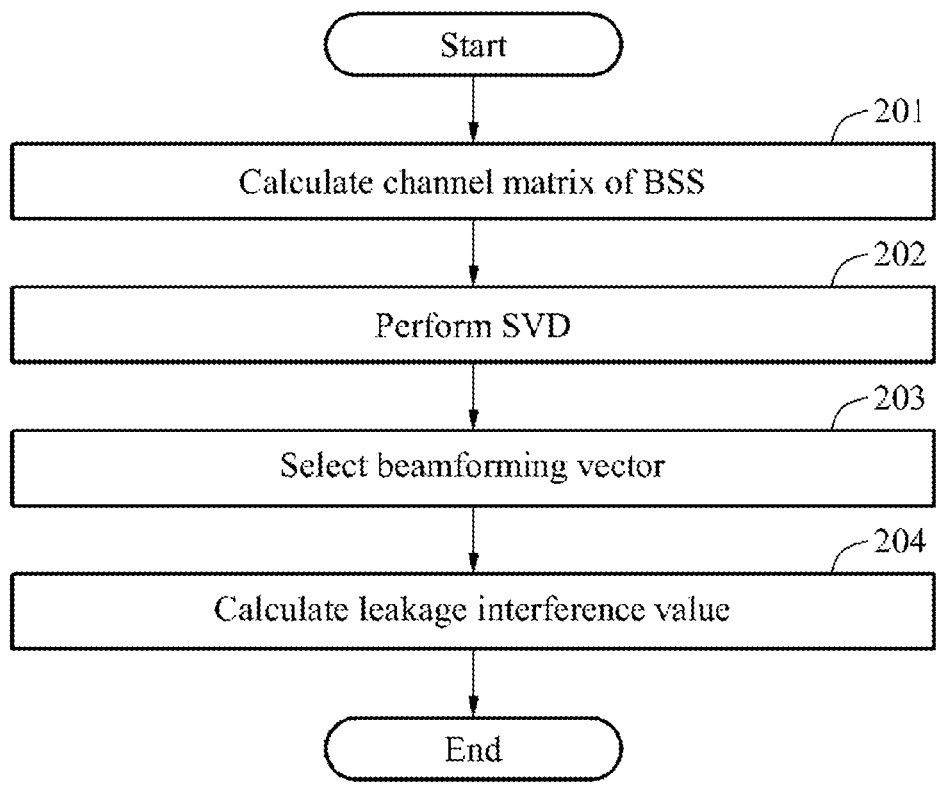
FIG. 2 is a flowchart illustrating a frame transmission method of interference alignment (IA) and controlling through a beamforming method based on a singular value decomposition (SVD) according to an embodiment of the present invention.

FIG. 2 is a flowchart illustrating a frame transmission method of IA and controlling through a beamforming method based on a singular value decomposition (SVD) according to an embodiment of the present invention.

In operation 201, the frame transmission method of IA and controlling through the beamforming method based on the SVD may calculate a channel matrix of a BSS by measuring channel information between an access point and a user terminal.

Each of the access points may allow a user terminal to measure channel information between the user and the access point by periodically transmitting a sounding frame and a beacon frame.

The access point using multiple antennas includes a space in which a number of data streams corresponding to a number of antennas are to be simultaneously received. A portion of the space may be used as a desired signal space and the remaining space may be used as an interference space. The interference space corresponds to a space allowing interference from the user terminals in different cells and the desired signal space corresponds to a space set by the access point to receive a signal. The user terminals in different cells may minimize a number of signals directed to the desired signal space. Related information may be stored in the beacon frame.

An example of beamforming based on SVD may be described as shown below.

K cells may coexist, each access point may include M antennas, and each user terminal may include L antennas. Each access point may support simultaneous transmission of $S(\leq M)$ streams through an uplink. A size of the desired signal space is denoted as S. Each user terminal may transmit a stream. A channel matrix from a user terminal j in a cell i to an access point j may be expressed as $H_k^{[i,j]} \in C^{M \times L}$. Each user terminal may estimate the channel matrix from a beacon packet or a sounding packet periodically transmitted from the access points.

An access point k generates an interference space $Q_k = [q_{k,1}, q_{k,2}, \ldots, q_{k,M-S}]$ for the IA based on a random scheme. A null space of $Q_k$ corresponding to a desired signal space may be expressed as shown below.

$$U_k = [u_{k,1}, u_{k,2}, \ldots, u_{k,S}] = \text{null}(Q_k)$$

A cell k may transmit $Q_k$ and $U_k$ to every station through a beacon and the like. Since $Q_k$ and $U_k$ are generated based on the random scheme, $Q_k$ and $U_k$ may be influenced by values of M and S.

In operation 202, the frame transmission method of IA and controlling may perform the SVD based on the calculated channel matrix and select a beamforming vector in consideration of an interference amount associated with another access point based on the SVD performed in the channel matrix.

Each user terminal may calculate the beamforming vector of which the interference amount associated with a desired signal space in another cell is a minimum. A beamforming scheme in the foregoing example may be described as shown below.

According to the frame transmission method of IA and controlling, a channel associated with desired signal spaces of other access points may be preferentially expressed in a format of Equation 1 in order to generate a beamforming vector $W^{[i,j]} (\|W^{[i,j]}\|^2 = 1)$ of a user terminal j in a cell i.

$$G^{[i,j]}=[(U_1^H H_1^{[i,j]})^T, \ldots, (U_{i-1}^H H_{i-1}^{[i,j]})^T, (U_{i+1}^{[i,j]} H_{i+1}^{[i,j]})^T, \ldots, (U_K^H H_K^{[i,j]})^T]^T \quad \text{[Equation 1]}$$

The frame transmission method of IA and controlling may calculate a format of Equation 2 by performing the SVD with respect to $G^{[i,j]}$.

$$G^{[i,j]}=\Omega^{[i,j]}\Sigma^{[i,j]}V^{[i,j]} \quad \text{[Equation 2]}$$

In operation 203, the frame transmission method of IA and controlling may select the beamforming vector in Equation 3 based on Equation 2. Concisely, the frame transmission method of the IA and controlling may select the beamforming vector of which the interference amount associated with another access point is a minimum.

$$w_{SVD}^{[i,j]} = \arg\min_{v} \|G^{[i,j]}v\| = v_L^{[i,j]} \quad \text{[Equation 3]}$$

In operation 204, the frame transmission method of IA and controlling may calculate a leakage interference (LIF) value based on the selected beamforming vector.

The frame transmission method of IA and controlling may calculate an amount of the LIF value defined by Equation 4 based on the beamforming vector through the user terminal.

$$\eta^{[i,j]} = \sum_{k=1,k\neq i}^{K} \|U_k^H H_k^{[i,j]} w^{[i,j]}\|^2 \quad \text{[Equation 4]}$$

The LIF value may represent a total amount of interference associated with another cell.

Figure 3:
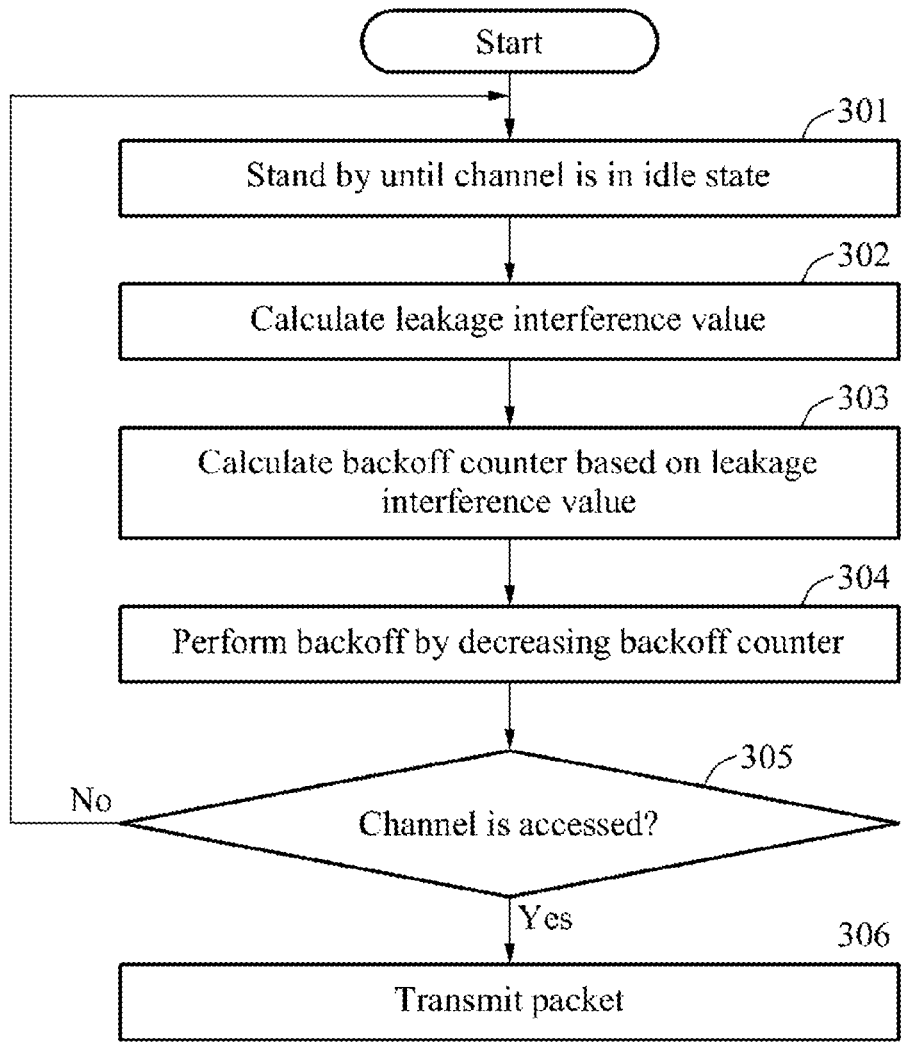
FIG. 3 is a flowchart illustrating a frame transmission method of IA and controlling through a backoff method for a channel access according to an embodiment of the present invention.

FIG. 3 is a flowchart illustrating a frame transmission method of IA and controlling through a backoff method for a channel access.

In operation 301, a channel may stand by until the channel is in an idle state and backoff may be performed based on operations 302 through 306 when the channel is in the idle state.

Concisely, the backoff method for the channel access may receive a CW value broadcasted by an access point and set a backoff counter based on the received CW value. Also, an LIF value related to the access point monitored for a predetermined period of time may be generated and the backoff may be performed by setting the backoff counter when the channel is in the idle state.

To perform the backoff, a range of cumulative distribution function (CDF) values may be divided based on the CW value and the LIF value may be calculated based on a channel condition during a transmission attempt. Also, the CDF values corresponding to the calculated LIF value may be calculated and the backoff counter may be selected based on the calculated CDF values.

Access points may periodically broadcast the CW value and each user terminal may set the backoff counter between 0 and the CW value.

Each user terminal may monitor the LIF value related to other access points in a long period of time and generate the related CDF.

Each user terminal may perform the backoff when the channel is in the idle state and the backoff counter may determine a value from 1 to the CW value based on a channel characteristic, for example, an LIF value.

Figure 4:
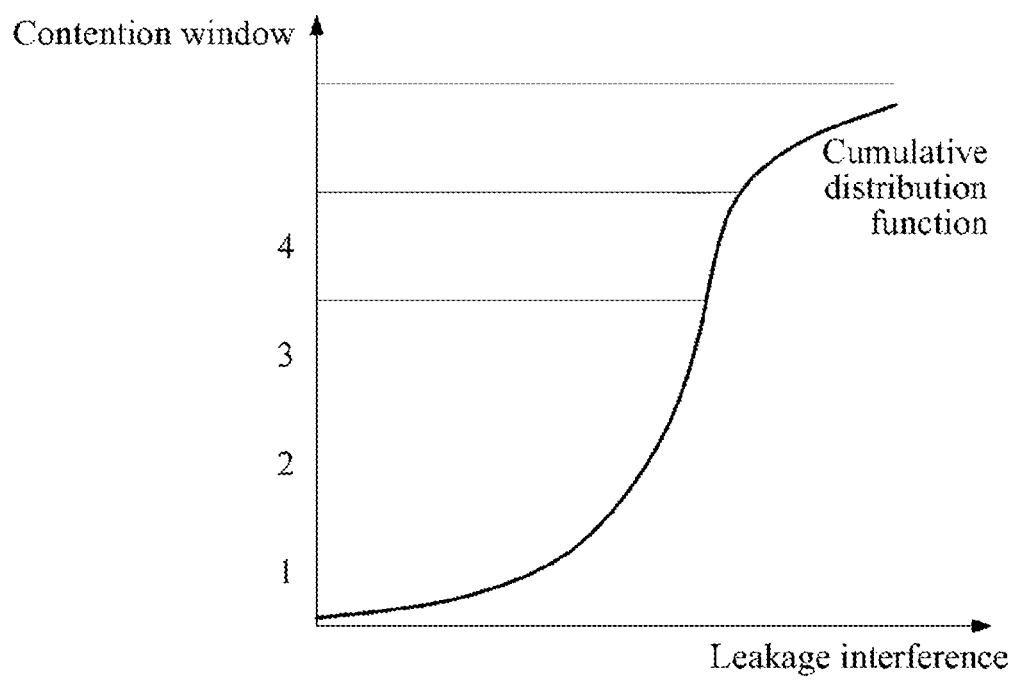
FIG. 4 is a diagram illustrating a cumulative distribution function (CDF) values associated with a leakage interference (LIF) value and a contention window (CW) value according to an embodiment of the present invention.

Referring to FIG. 4, a frame transmission method of IA and controlling may divide a range of CDF values based on a contention window value.

For example, FIG. 4 illustrates the CDF values associated with an LIF value and the CW value.

In operation 302, the frame transmission method of IA and controlling may calculate the LIF value based on a channel condition during a transmission attempt and calculate the CDF values corresponding to the calculated LIF value. In operation 303, the frame transmission method of IA and controlling may calculate a backoff counter based on the calculated LIF value.

In operation 304, the frame transmission method of IA and controlling may perform backoff by decreasing the backoff counter by 1 for each backoff slot and attempting a packet transmission through a user terminal of which the backoff counter is to be 0.

Referring to FIG. 4, user terminals having small LIF values may set small backoff counters, thereby accessing channels.

In operation 306, the frame transmission method of IA and controlling may determine whether a channel is accessed and transmits a packet when the channel is accessed. When the channel is not accessed, the frame transmission method of IA and controlling may return to operation 301 and standby until the channel is in an idle state.

Based on a backoff algorithm, simultaneous transmissions of the user terminals may be generated.

When packet transmissions fail to be performed for all user terminals during the simultaneous transmissions, all user terminals in the system may increase the CW value to be doubled and use the doubled CW value during a subsequent packet transmission attempt. When the CW value reaches a predetermined maximum value, the increased CW value may be maintained in lieu of an increase. When a packet transmission of a predetermined user terminal succeeds, an acknowledgement may be broadcasted by a corresponding access point. Accordingly, all user terminals may read information associated with the foregoing description and initiate the CW value as a predetermined minimum value.

Preferentially, when a channel is not occupied, the user terminal may calculate the LIF value based on a channel condition. A process of the calculation of the LIF value may include a beamforming based on an SVD on a physical layer. The backoff counter may be set based on the calculated LIF value using the CW value and the CDF values corresponding to the LIF value. The backoff counter may decrease for each backoff slot and suspend the backoff when another user terminal attempts the packet transmission. When the packet transmission is not performed and the backoff counter is 0, the user terminal may attempt the packet transmission and enter into a third stage.

The packet transmission may succeed or fail in response to interferences from the user terminals to which the simultaneous transmissions are to be directed.

The CW value for a channel access may be set.

The CW value is set at the access point based on a first throughput obtained from a packet that arrives in a desired signal space and a second throughput to be obtained through a multiple-packet recovery using a user terminal performing simultaneous transmissions throughout a system. The CW value is set as a constant based on a reciprocal value to maximize a sum of the first throughput and the second throughput.

A case in which K cells coexist, each access point includes M antennas, and each user terminal includes L antennas may be considered.

Each cell may include N users and each access point may set a size of a desired signal space to correspond to S. When an interference amount from another cell is sufficiently small, the access point may theoretically support simultaneous transmissions of users in a cell for a maximum of S users. A transmission probability p of the user terminals may be approximate to 1/CWmin, and a throughput corresponding to the foregoing description may be expressed as shown in Equation 1.

[Equation 5]

$$\text{Throughput} = K \left\{ \frac{\sum_{m=1}^{S} m \binom{N}{m} p^m (1-p)^{N-m}}{\sigma(1-p)^{NK} + T[1-(1-p)^{NK}]} + \frac{\sum_{m=S+1}^{M} m \binom{N}{m} p^m (1-p)^{N-m} * \left[ \sum_{i=0}^{M-m} \binom{N(K-1)}{i} p^i (1-p)^{N(K-1)-i} \right]}{\sigma(1-p)^{NK} + T[1-(1-p)^{NK}]} \right\}$$

In Equation 1, a first portion in the parentheses denotes a first throughput corresponding to the throughput obtained from the packet that arrives in the desired signal space. The second portion in the parentheses denotes a second throughput corresponding to a throughput to be obtained through a multiple-packet recovery since a number of users performing simultaneous transmissions throughout a system is less than a number of antennas of access points. In Equation 5, a p_optimal value to maximize a throughput may be preferentially calculated and the CW value may be calculated as a constant approximate to a reciprocal value 1/p_optimal.

Figure 5:
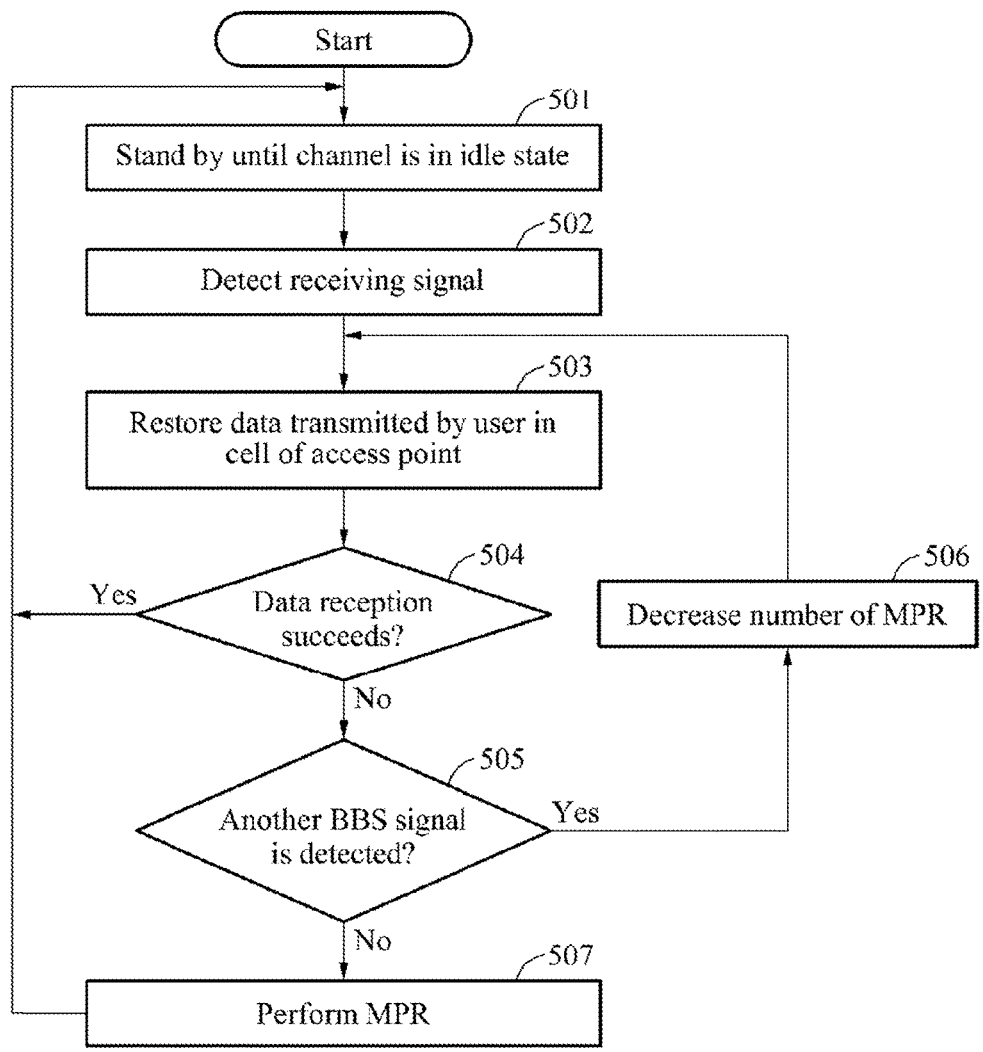
FIG. 5 is a flowchart illustrating a frame transmission method of IA and controlling through a stream reception method at an access point according to an embodiment of the present invention.

FIG. 5 is a flowchart illustrating a frame transmission method of IA and controlling through a stream reception method at an access point.

In a multi-cell network based on a random access, multiple users may attempt simultaneous transmissions. An access point may verify whether a user attempting data transmission corresponds to a user in a cell of the access point, thereby differentiating a receiving method in response to a number of users attempting entire simultaneous transmissions.

The frame transmission method of IA and controlling describes a receiving method at an access point.

In operation 501, the frame transmission method of IA and controlling may stand by until a channel is in an idle state.

In operation 502, the access point may preferentially detect a receiving signal. In operation 503, the access point may restore data transmitted by the user in the cell of the access point in a desired signal space of the access point.

When a number of users attempting simultaneous transmissions in different cells is greater than a size of a desired signal space, data reception may fail. In such a case, when a number of attempting simultaneous transmissions in different cells is verified to be less than a number of antennas at the access point, reception may be performed based on a multiple-packet receive scheme. Since a reception of a BSS signal is not performed and a size of a desired signal space of the BSS increases, a multiple-packet reception (MPR) may be available.

The frame transmission method of IA and controlling may return to operation 501 and stand by until the channel is in the idle state when the data reception succeeds in response to a result of determination performed in operation 504.

In operation 505, when the data reception fails in response to the result of determination performed in operation 504, the frame transmission method of IA and controlling may further determine whether another BBS signal is detected.

When another BBS signal is detected, the frame transmission method of IA and controlling may return to operation 503 by decreasing a number of the MPR.

In operation 507, when another BBS signal is not detected, the frame transmission method of IA and controlling may perform the MPR.

When another BSS signal is detected, the data reception in the desired signal space fails such that the access point may perform an additional MPR.

Figure 6:
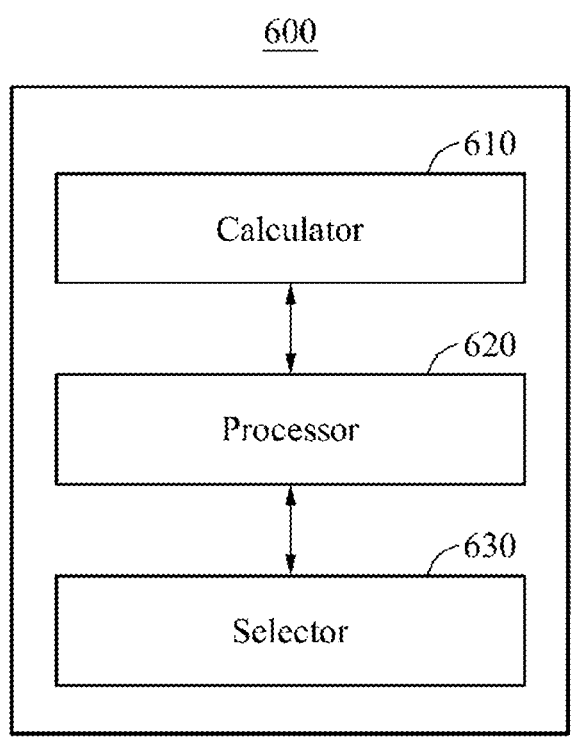
FIG. 6 is a block diagram illustrating a frame transmission system of an IA and controlling using a beamforming based on SVD according to an embodiment of the present invention.

FIG. 6 is a block diagram illustrating a frame transmission system 600 of IA and controlling using a beamforming based on an SVD.

The frame transmission system 600 of IA and controlling includes, for beamforming based on an SVD, a calculator 610, a processor 620, and a selector 630.

The calculator 610 may calculate a channel matrix of a BSS by measuring channel information between an access point and a user terminal.

For example, the calculator 610 calculates a channel matrix by measuring channel information including a sounding frame and a beacon frame periodically transmitted to a user terminal from an access point. Also, the calculator 610 transmits desired signal space information including a null space and interference space information randomly generated for IA to the user terminal through the sounding frame or the beacon frame, In this example, the interference space is information associated with an interference space allowing interference from user terminals in different cells, and the desired signal space information is information associated with a space set by the access point to receive a signal.

The processor 620 performs the SVD based on the calculated channel matrix and the selector 630 selects a beamforming vector in consideration of an interference amount associated with another access point based on the SVD performed by the channel matrix.

Figure 7:
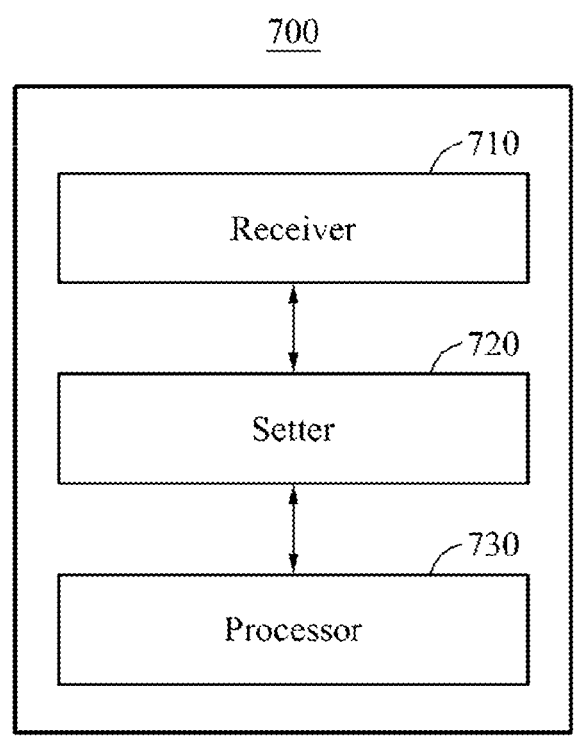
FIG. 7 is a block diagram illustrating a frame transmission system of IA and controlling using a backoff for a channel access according to an embodiment of the present invention.

FIG. 7 is a block diagram illustrating a frame transmission system 700 of IA and controlling using a backoff for a channel access The frame transmission system 700 of IA and controlling includes, for a backoff for a channel access, a receiver 710, a setter 720, and a processor 730.

The receiver 710 receives a CW value broadcasted by an access point.

The setter 720 sets a backoff counter based on the received CW value.

The processor 730 generates an LIF value related to an access point monitored for a predetermined period of time and performs a backoff by setting the backoff counter when a channel is in an idle state.

For example, the processor 730 divides a range of CDF values based on the CW value, calculates the LIF value based on a channel condition during a transmission attempt, calculates the CDF values corresponding to the calculated LIF value, and selects the backoff counter based on the calculated CDF values.

Figure 8:
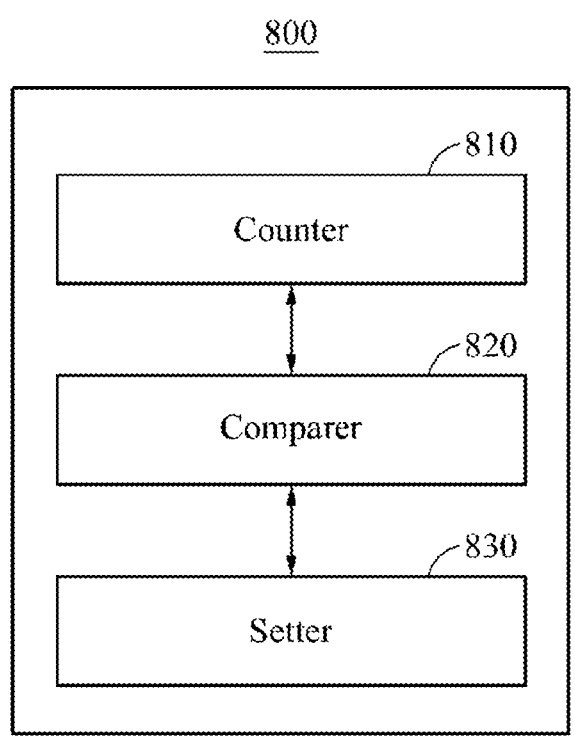
FIG. 8 is a block diagram illustrating a frame transmission system of IA and controlling using a stream reception at an access point according to an embodiment of the present invention.

FIG. 8 is a block diagram illustrating a frame transmission system 800 of IA and controlling using a stream reception at an access point.

The block diagram illustrating the frame transmission system 800 of IA and controlling includes, for a stream reception at an access point, a counter 810, a comparer 820, and a setter 830.

The counter 810 may verify a number of users performing simultaneous transmissions in different cells.

The comparer 820 may compare the verified number of users to a number of antennas at the access point.

The setter 830 may set, based on the result of the comparing, to receive a stream in a multiple-packet scheme when the number of antennas at the access point is less than the verified number of users.

The block diagram illustrating the frame transmission system 800 may further include a determiner configured to determine whether multiple users attempt the simultaneous transmissions. The counter 810 may verify the number of users performing simultaneous transmissions in different cells when the multiple users attempt the simultaneous transmissions.

Accordingly, an interference amount associated with access points in cells of user terminals in a random access network may reduce thereby enhancing performance in multi-cell.

Also, to implement the IA scheme in an actual system, signaling overhead among geometrically increasing nodes that may be needed. Therefore, technology for solving an issue of the need of the signaling overhead and maximizing a performance gain of the IA in a random access network may be required.

The above-described exemplary embodiments of the present invention may be recorded in computer-readable media including program instructions to implement various operations embodied by a computer. The media may also include, alone or in combination with the program instructions, data files, data structures, and the like. Examples of computer-readable media include magnetic media such as hard disks, floppy disks, and magnetic tape; optical media such as CD ROM disks and DVDs; magneto-optical media such as floptical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described exemplary embodiments of the present invention, or vice versa.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. A frame transmission method of interference alignment (IA) and controlling, the method comprising:
   verifying channel information associated with an adjacent channel;
   receiving a receiving vector from an access point of the adjacent channel;
   calculating an effective channel matrix using the verified channel information and the received receiving vector;
   measuring an interference amount based on the calculated effective channel matrix; and
   selecting a user terminal to which transmission is to be directed based on the measured interference amount.

2. The method of claim 1, wherein the calculating comprises calculating the effective channel matrix by measuring the channel information comprising a sounding frame or a beacon frame periodically transmitted to the user terminal from the access point.

3. The method of claim 1, wherein the calculating comprises transmitting desired signal space information comprising a null space and interference space information randomly generated for IA to the user terminal through the sounding frame or the beacon frame,
   wherein the interference space information is information associated with an interference space allowing interference from user terminals in different cells, and
   the desired signal space information is information associated with a space set by the access point to receive a signal.

* * * * *